United States Patent [19]

Scherping et al.

[11] 4,385,876
[45] May 31, 1983

[54] SPLIT WEAR LINER FOR TWIN BORE BARREL ASSEMBLY

[75] Inventors: Clarence K. Scherping, Saginaw; Wesley J. Parth, Frankenmuth, both of Mich.

[73] Assignee: Baker Perkins Inc., Saginaw, Mich.

[21] Appl. No.: 911,183

[22] Filed: May 31, 1978

[51] Int. Cl.³ .................... F01C 21/10; B03B 3/00; B29B 1/10
[52] U.S. Cl. .................................. 418/201; 100/146; 366/85; 425/204
[58] Field of Search ............... 418/201; 100/127, 146; 366/85, 291, 301; 425/204, 376 R, 192

[56] References Cited

U.S. PATENT DOCUMENTS 3,590,429 7/1971 Bammert et al. ................ 425/192
3,696,736 10/1972 Studli ................................. 100/146
3,970,113 7/1976 Guttinger et al. ............ 425/204 X
4,028,027 6/1977 Worz .................................. 418/201

Primary Examiner—Leonard E. Smith
Attorney, Agent, or Firm—Learman & McCulloch

[57] ABSTRACT

A barrel assembly for a twin screw mixer or similar device is especially designed for ready access to a replaceable split liquid tight barrel liner which is accurately held in seated position within a housing block by a minimum number of bolts or other detachable connectors. Housing blocks are formed with liner half receiving recesses defined by flat surfaces which include inwardly convergent side walls and a flat inner wall. The liner half is of complementary shape and projects slightly from the recess, when seated in the recess so that closing of the housing blocks engages abutting surfaces on the two liner halves to clamp these surfaces against each other during operation of the machine. The housing blocks are mounted upon the machine frame by brackets for swinging movement about horizontal axes, meshing pinion gears couple the housing blocks to each other so that the weight of one housing block is counterbalanced by the other during opening and closing movements.

10 Claims, 1 Drawing Figure

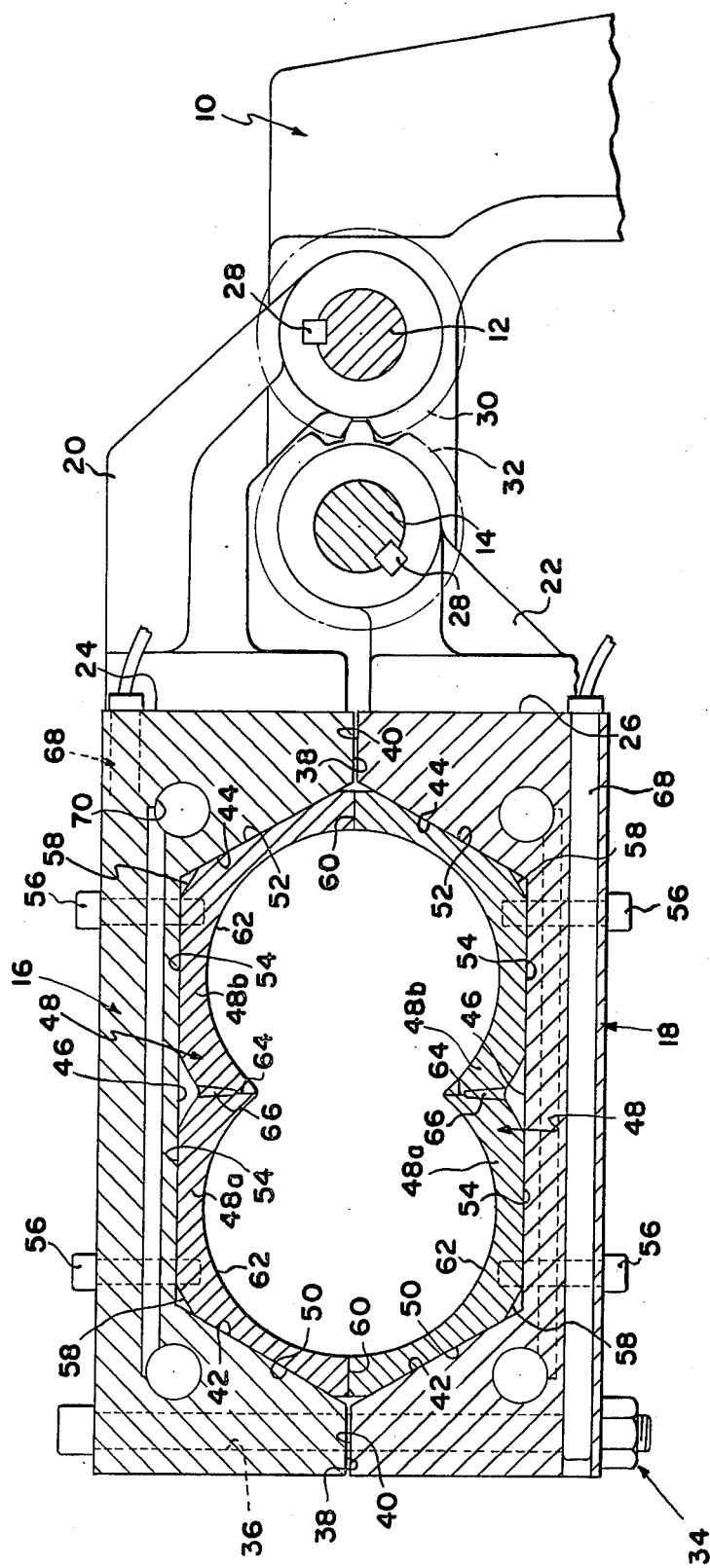

SPLIT WEAR LINER FOR TWIN BORE BARREL ASSEMBLY

BACKGROUND OF THE INVENTION

Replaceable wear liners for twin screw mixers and similar machines are well known, however, prior art liners of the required "hard" material, particularly in the case where the screws were of substantial length, are frequently difficult to machine to the required tolerances and present alignment and locating problems in installation. In many cases, in attempting to minimize the degree of precision of the machining operations for producing the liners, the liners are manufactured in sections, (see for example Worz U.S. Pat. No. 4,028,027) thereby increasing the difficulty of accurately installing the liners in position within their housing.

The present invention is especially directed to a liner assembly in which the surfaces of the liner are either flat or cylindrical, minimizing the difficulties of the forming operation to a point where full length liners can be readily constructed to a high degree of dimensional precision.

SUMMARY OF THE INVENTION

In accordance with the present invention, a pair of housing blocks are formed with opposable longitudinally extending recesses defined by flat longitudinal side walls convergently inclined inwardly of each block and a flat inner wall. The cross sectional configuration of the two recesses when the housing blocks are in their facing opposed closed position is that of a horizontally expanded hexagon.

The housing blocks are supported upon the machine frame by individual brackets which are respectively rotatively locked to a pair of elongate shafts mounted in the machine frame for rotation about parallel horizontal axes lying in a horizontal general plane toward which the housing blocks swing from opposite sides of the plane upon rotation of their respective mounting shafts. The two mounting shafts are coupled to each other by meshed pinion gears so that rotation of one shaft requires a corresponding rotation of the other shaft by an equal amount in the opposite direction. The coupling between the meshed pinion gears thus effectively counterbalances the weight of one housing block against the other so that the two housing blocks may be easily swung toward or away from each other between their closed position in substantial face to face engagement with each other and an opened position in which the recesses are readily accessible for the installation or replacement of detachable liner halves.

The liner halves are constructed with external surfaces complementary in shape to those of the respective recesses so that the liner half can be seated in the liner half recess of the mounting block in face to face contact with all three of the block recess defining walls. Cylindrical screw receiving recesses are formed in each liner half and flat opposed mating edge surfaces on the opposed liner halves extend along the outer longitudinal edges of the screw receiving recesses to be engaged in face to face abutment with each other when the housing blocks are located in their closed position. The liner halves project slightly from their block receiving recesses so that when the housing blocks are moved to their closed position, the mating liner half surfaces engage each other while the opposed surfaces of the housing blocks are still slightly spaced from each other. Clamping bolts are employed to lock the housing blocks in their closed position, firmly clamping the mating liner half surfaces to each other. The convergently inclined side wall surfaces of the recess in the housing block exerts a wedging action which maintains the liner half in accurate alignment with the housing block, and thus a minimum number of mounting bolts are required to detachably secure the liner halves to their respective mounting blocks, thus simplifying removal and installation of the liner halves.

IN THE DRAWING

FIG. 1 is a transverse cross sectional view through a twin screw barrel assembly embodying the present invention.

The present invention is specifically directed to a liner half and barrel assembly for twin screw extruders, mixers or similar machines. The overall construction of machines of this type is well known to those skilled in the art, see, for example, U.S. Pat. No. 3,195,868, which we incorporate herein by reference, and thus details of the machine extraneous to the present invention are not here disclosed. The single FIGURE of drawings is a transverse cross sectional view taken through a twin screw mixer assembly which may be as much as several feet in length (i.e. the dimension perpendicular to the paper in the drawing.)

Partially shown in the drawing is a portion of the fixed frame of the machine designated generally 10 in which are rotatably supported a pair of spaced parallel horizontally extending shafts 12 and 14. Elongate upper and lower housing blocks 16 and 18 are supported from shafts 12 and 14 respectively by brackets 20 and 22. Brackets 20 and 22 are fixedly secured, as by bolts, unshown, to the longitudinal side surfaces 24,26 of blocks 16 and 18 and are rotatably locked at their opposite ends as by keys 28 to shafts 12 and 14. Meshing pinion gears 30,32 rotatively locked to the respective shafts 12 and 14 couple the shafts to each other so that rotation of one shaft requires an equal and opposite rotation of the other shaft.

As shown in drawings, housing blocks 16 and 18 are located in their closed position in which they are drawn toward face to face abutment with each other by a plurality of clamping assemblies designated generally 34 which pass through aligned bores 36 in the respective blocks 16 and 18. By disassembling and withdrawing the clamping assemblies 34, the blocks 16 and 18 can be separated from each other by swinging block 18 downwardly about the axis of its mounting shaft 14, this motion being transmitted via pinion gears 32,30 to shaft 12 which causes a corresponding upward rotation of upper housing block 16 about the axis of shaft 12. Although the housing blocks are quite massive and horizontally offset from their respective mounting shafts, the pinion gear coupling between the two shafts provides a counterbalancing action in which the weight of one block is counterbalances by the weight of the other block so that very little manual effort is necessary to swing the blocks between their open position and the illustrated closed position.

Each of housing blocks 16 and 18 is formed with a longitudinally extending liner half receiving recess extending inwardly of the block from the respective surfaces 38 and 40 of blocks 16 and 18 respectively. The liner block receiving recess is defined by a pair of equally inwardly convergent flat longitudinal side walls 42, 44 and a flat inner wall 46. In the drawing, with the blocks in the closed position shown, the recesses in upper and lower blocks 16 and 18 have the general shape of a horizontally elongate hexagon, although it should be noted that for reasons explained below, the opposed surfaces 38 and 40 of blocks 16 and 18 are slightly spaced from each other when the blocks are closed.

Like liner halves designated generally 48 are detachably mounted within the block recesses defined by walls 42, 44 and 46, the liner halves having longitudinally extending external side wall surfaces 50,52 inclined at an angle complementary to that of the block recess side walls 42,44 and a flat, interrupted, external surface 54 oriented to engage inner wall surface 46 of the housing block in flat face to face engagement as illustrated. Mounting bolts 56 passing through bores in housing blocks 16 and 18 are threadably received in each liner half 48 to detachably secure the liner halves in position within the respective block recesses. Bevels 58 are cut into the external surfaces of liner halves 48 at the juncture of side wall surfaces 50 and external wall surfaces 54 to provide a slight relief in this region simplifying the assembly and seating of liner halves 48 within the block recesses.

When the housing blocks are in their closed position, the two seated liner halves 48 are clamped together in face to face relationship with each other at longitudinally extending flat abutment surfaces 60. The interior of the liner half is formed with cylindrical internal surfaces 62 which, with the assembly in the position as shown in the drawings, cooperatively define intersecting cylindrical screw receiving chambers for an intermeshing pair of screws, not shown. The abutment surfaces 60 lie in a common general plane which contains the centers of the cylindrical surfaces 62 and, when the housing blocks are closed, also contains the axes of revolution of shafts 12 and 14.

From the drawings, it will be noted that when the housing blocks 16 and 18 are clamped in their closed position, the liner halves 48 project slightly from the liner half receiving recesses in the blocks so that while the opposed surfaces 60 are firmly clamped against each other, a slight spacing exists between the opposed surfaces 38 and 40 of the respective blocks 16 and 18. The amount of spacing between faces 38 and 40 is not overly critical and thus eliminates the necessity of any great degree of precision in machining and locating surfaces 38 and 40. The opposed abutting surfaces 60 of the liner halves 48 thus have the entire clamping force exerted by clamping assemblies 34 applied to these two surfaces to thus form a tight seal at the joints between the upper and lower liner halves 48.

To simplify the forming operations, each liner half is preferably constructed from two identical liner half sections 48a and 48b. In addition to the surfaces previously described, each liner half section is formed with a longitudinally extending side edge surface 64, the surfaces 64 of each mating pair of liner half sections 48a and 48b being abutted with each other, as illustrated and the two half sections then being fixedly secured to each other in permanent assembled relationship as by a weldment 66. This arrangement substantially simplifies the machining operations required to form the liner half sections, since each section is formed by machining simple flat surfaces 42 (or 44) 54, 60 and 64 and a single cylindrical surface section 62 of constant radius. These surfaces are relatively simple to machine to the required degree of precision.

Housing blocks 16 and 18 are formed with suitably arranged internal passages for receiving heaters, partially indicated at 68, or for conducting coolant fluid as at 70. Because the liner halves 48 can be readily machined to a precise fit within the recesses in housing blocks 16 and 18, only a minimum number of bolts such as 56 are required to retain the liner halves accurately positioned within the housing block. This assembly arrangement, by employing a minimum number of mounting bolts 56 also obviously simplifies the installation or removal of a liner half. The block mounting arrangement upon rotary shafts 12 and 14 enables the blocks 16 and 18 to be swung away from each other to make liner halves 48 readily accessible for removal or replacement.

While one embodiment of the invention has been described in detail, it will be apparent to those skilled in the art the disclosed embodiment may be modified. Therefore, the description is to be considered exemplary rather than limiting, and the true scope of the invention is that defined in the following claims.

We claim:

1. In a barrel assembly for a screw type mixer or the like having a frame, a pair of elongate housing blocks mounted upon said frame and detachably clampable to each other in an opposed closed position, and a pair of like elongate liner halves detachably mounted in said housing blocks having elongate screw receiving recesses therein cooperable when said housing blocks are clamped in their closed position to define a screw receiving chamber; the improvement wherein said elongate housing blocks are disposed in horizontal positions one above the other when in their closed position, a pair of shafts mounted in said frame for rotation about spaced horizontal axes parallel to the longitudinal extent of said blocks, bracket means on each of said housing blocks fixedly coupling the blocks respectively to said shafts, and a pair of pinion gears respectively fixed to said shafts and meshed with each other for transmitting rotation of one shaft to the other, the axes of said shafts lying in a common horizontal plane and said blocks being symetrically disposed on opposite sides of said plane during counterbalanced movement of said blocks between said closed position and an open position wherein said liner halves are accessible for removal or replacement.

2. In a barrel assembly for a twin screw mixer or the like having a frame, twin screw shafts, a pair of separable elongate housing blocks mounted upon said frame and detachably clampable to each other in an opposed closed position, and a pair of like, unitary, elongate liner halves detachably mounted in said housing blocks having elongate connected parallel bores to receive the respective screw shafts therein cooperable when said housing blocks are clamped in said closed position to define a twin screw receiving chamber having saddles between the bores; the said housing blocks having internal first elongate faces disposed in facing opposed relationship to each other when said blocks are in said closed position, each of said first faces having a liner half receiving recess therein defined by longitudinally extending walls forming a liner half receiving cavity, each cavity being bounded by longitudinally extending edge face surfaces on each side which confront like surfaces on the other housing block, each of said liner halves having external surfaces complementary to said cavity and engageable therewith in face-to-face relationship when the liner half is seated in said recess, and said liner halves having mating face surfaces extending longitudinally along each side of the screw receiving recesses engageable with face-to-face abutment with each other when said halves are seated in said housing blocks and said blocks are in their closed position; the improvement wherein said mating face surfaces on the liner halves project beyond said edge face surfaces on the housing blocks such that, when the housing blocks are clamped in their closed position, the mating face surfaces of the liner halves are clamped in face-to-face abutting relationship with each other and said confronting edge faces on the mounting blocks are spaced from each other.

3. The invention defined in claim 2 wherein the mating face surfaces of said liner halves are flat surfaces, one of the housing blocks is mounted for hinged swinging opening and closing movement relative to the other, and said screw receiving recesses, when said liner halves are in face-to-face abutment with each other, are intersecting cylindrical surfaces having parallel axes lying in a common horizontal general plane containing the abutting face surfaces of said liner halves.

4. In a barrel assembly for a twin screw mixer or the like having a frame, twin screw shafts, a pair of separable elongate housing blocks mounted upon said frame and detachably clampable to each other in an opposed closed position, and a pair of like, unitary, elongate liner halves detachably mounted in said housing blocks having elongate connected parallel bores to receive the respective screw shafts therein cooperable when said housing blocks are clamped in said closed position to define a twin screw receiving chamber having saddles between the bores; the improvement wherein said housing blocks have internal first elongate faces disposed in facing opposed relationship to each other when said blocks are in said closed position, each of said first faces having a liner half receiving recess therein defined by opposite longitudinally extending flat side walls convergently inclined inwardly from said first face and an elongate flat inner wall extending between the side walls to form a chamber of expanded hexagonal cross section, each of said liner halves having external surfaces with convergent flat faces complementary to said side walls of said recess and engageable therewith in face-to-face relationship when the liner half is seated in said recess, each of said liner halves also having an external surface connecting said convergent flat faces and comprising flat faces which are complementary to and engaged with said inner flat wall, said liner halves having mating face surfaces extending longitudinally along each side of the screw receiving recesses engageable with face-to-face abutment with each other when said halves are seated in said housing blocks and said blocks are in their closed position.

5. The invention defined in claim 4 wherein the mating face surfaces of said liner halves are flat surfaces, and said screw receiving recesses, when said liner halves are in face to face abutment with each other, are intersecting cylindrical surfaces having parallel axes lying in a common horizontal general plane containing the abutting face surfaces of said liner halves.

6. The invention defined in claim 5 wherein each liner half comprises two like liner halve sections each having a longitudinal side edge surface lying in a vertical general plane passing through the line of intersection of the cylindrical recess surface, and a weldment extending along abutted side edge surfaces of a pair of said liner half sections to permanently secure said sections to each other into an assembled liner half.

7. The invention defined in any of claims 4, 5, and 6 wherein said face surfaces of said liner halves are projected from said first faces of the respective housing blocks when said liner halves are operatively seated therein whereby, when said housing blocks are clamped in their closed position, said face surfaces of said liner halves are clamped in abutting face to face relationship with each other and said first faces of said housing block are spaced from each other.

8. The invention defined in claim 4 further comprising mounting means mounting said housing blocks on said frame for coordinated movement toward and away from each other between said closed position and an open position wherein said liner halves are accessible for removal or replacement in said liner receiving recesses.

9. The invention defined in claim 8 wherein said mounting means comprises a pair of shafts mounted in said frame for rotation about parallel axes extending longitudinally of said blocks, a pair of bracket members fixedly secured respectively to said shafts for rotation therewith, means securing said bracket members respectively to said housing blocks, and meshed pinion gears fixed to said shafts for transmitting rotation of one shaft to the other.

10. The invention defined in claim 9 wherein the axes of rotation of said shafts are offset from one longitudinal side of said housing blocks and lie in a common horizontal plane extending between said first faces of said blocks, said first faces of said blocks being symetrically disposed on opposite sides of said plane at all positions of said blocks.

* * * * *